Aug. 13, 1940.    G. S. SIMMONS    2,211,519
SPRAYING APPARATUS
Filed Jan. 23, 1939    3 Sheets-Sheet 1
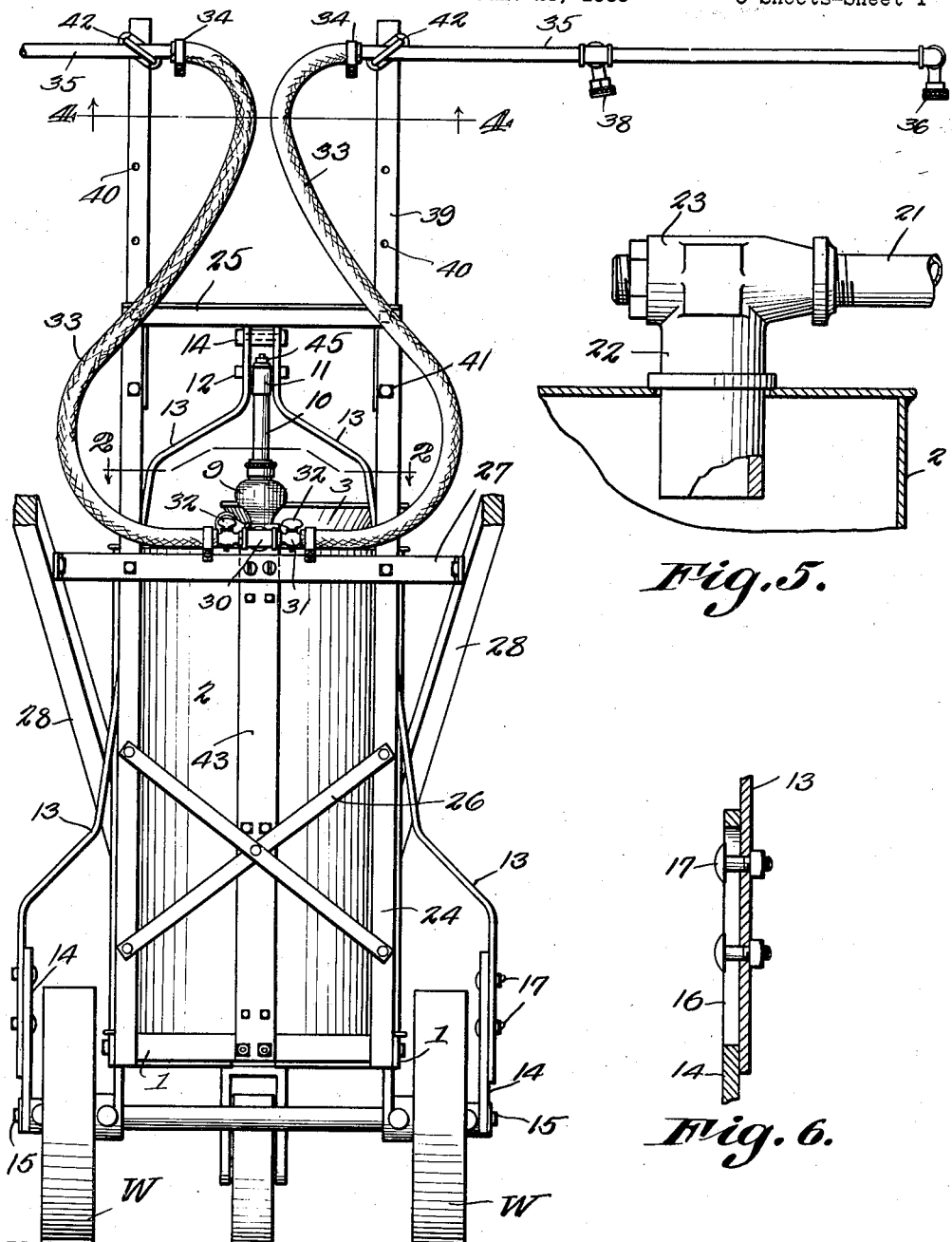
Fig. 1.
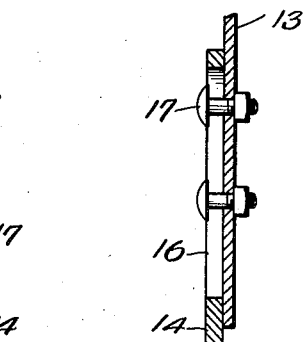
Fig. 5.
Fig. 6.
G. S. Simmons
INVENTOR.
BY Asnow & Co.
ATTORNEYS.

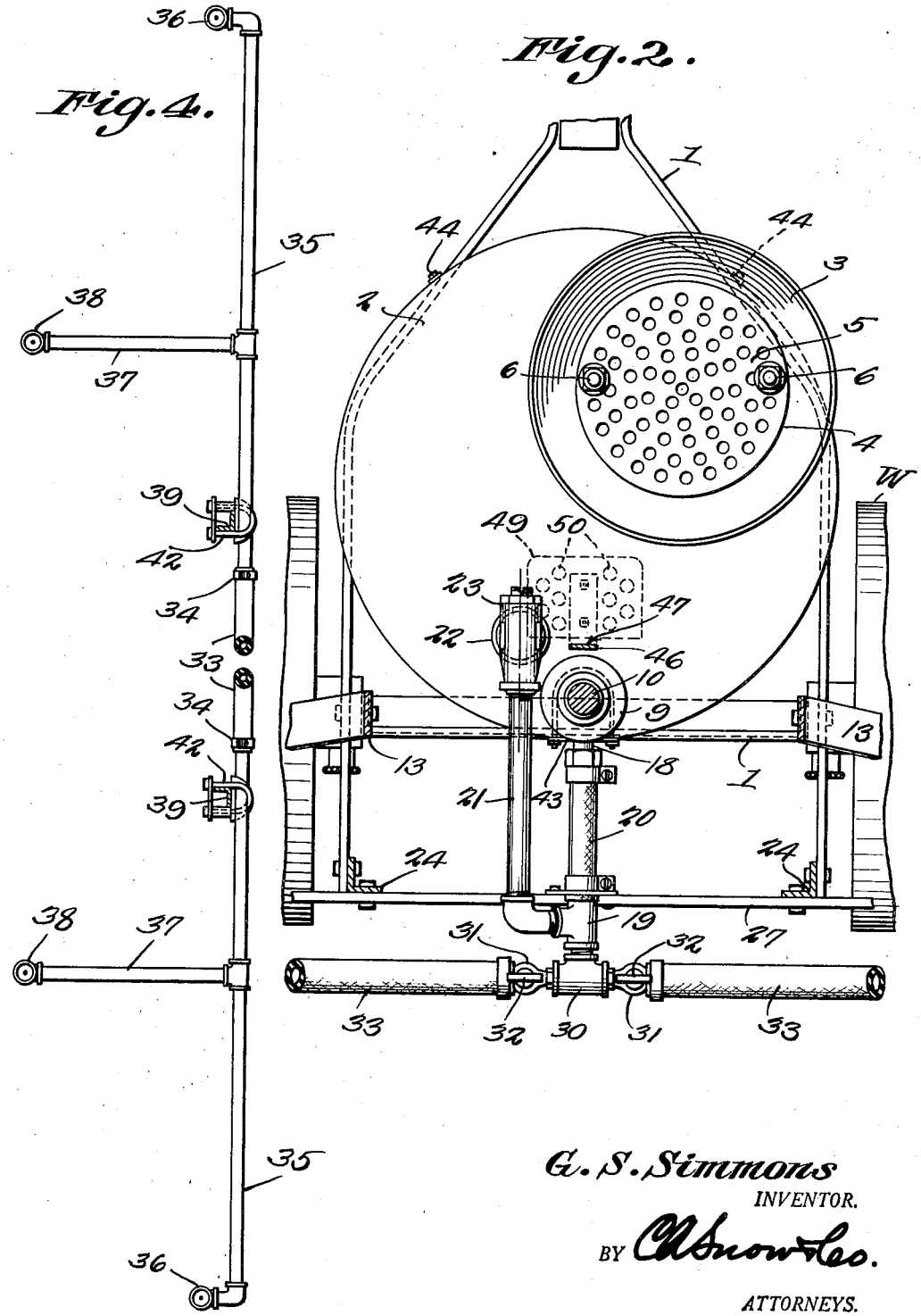

Aug. 13, 1940.   G. S. SIMMONS   2,211,519
SPRAYING APPARATUS
Filed Jan. 23, 1939   3 Sheets-Sheet 3

G. S. Simmons
INVENTOR.
BY C. A. Knowles
ATTORNEYS.

Patented Aug. 13, 1940

2,211,519

UNITED STATES PATENT OFFICE 2,211,519

SPRAYING APPARATUS

Grover S. Simmons, Elkin, N. C.

Application January 23, 1939, Serial No. 252,474

2 Claims. (Cl. 299—42)

This invention relates to spraying apparatus, one of the objects being to provide a simple, compact and efficient mechanism adapted to be moved between the rows of plants and equipped with mechanism whereby the spraying liquid, while being maintained in a constant state of agitation, will be withdrawn and expelled under pressure through spraying nozzles supported in a new and novel manner upon the frame of the apparatus.

A further object is to provide spraying nozzles so located that two rows can be sprayed simultaneously, the spray being directed upon the plants from opposite sides so as to insure thorough application of the spray.

A further object is to provide spraying nozzles which can be adjusted readily to different elevations, said nozzles being supported by an auxiliary frame which can be easily connected to or disconnected from the main frame of the machine.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a rear elevation of the machine, parts being broken away.

Figure 2 is an enlarged section on line 2—2, Figure 1.

Figure 4 is an enlarged section on line 4—4, Figure 1.

Figure 5 is a view partly in section and partly in elevation showing a portion of the release by-pass.

Figure 6 is a longitudinal section through a portion of a pump pitman.

Figure 3:
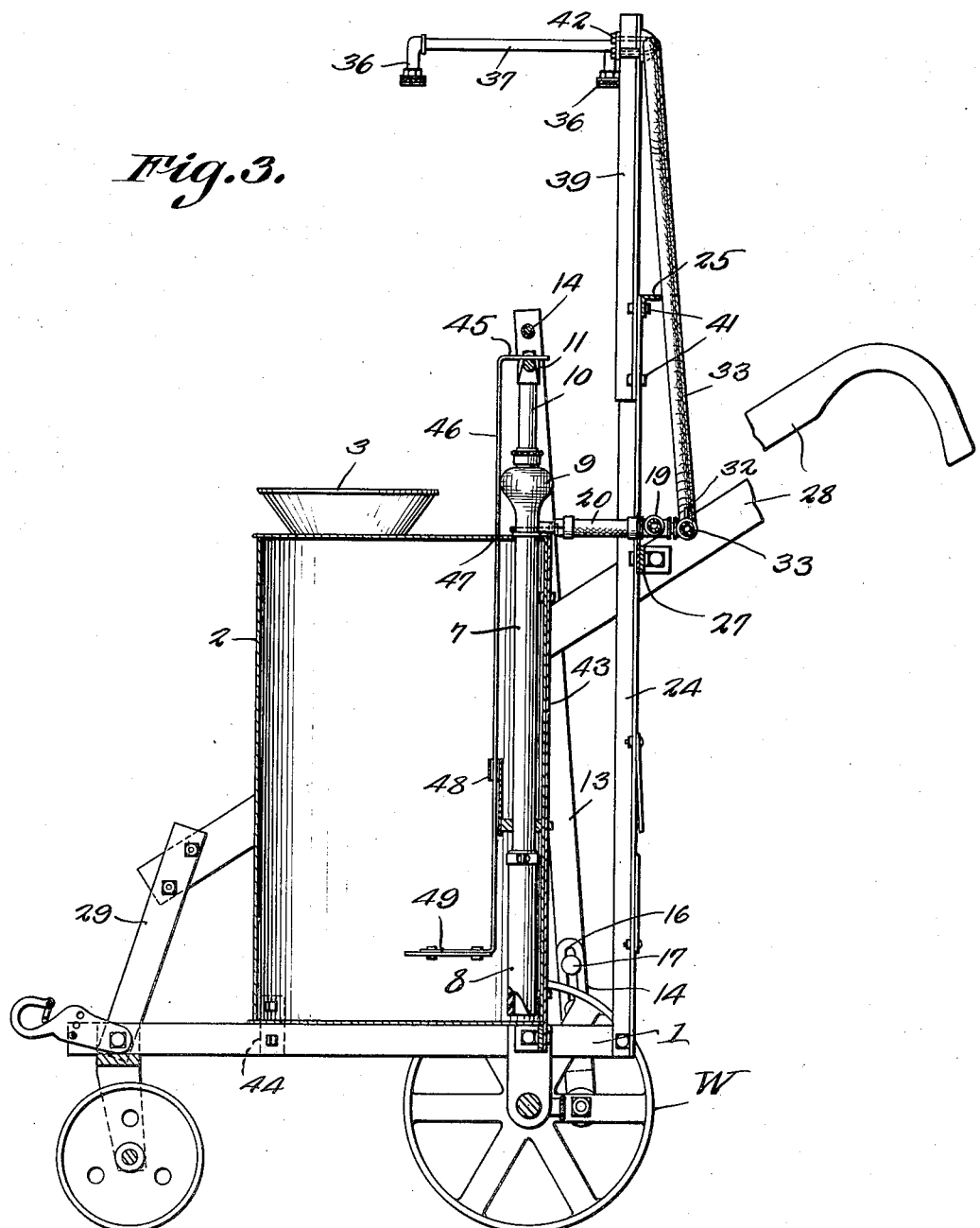
Figure 3 is a central vertical longitudinal section.

Referring to the figures by characters of reference 1 designates a wheel-supported frame on which is mounted a tank 2 for holding the liquid to be sprayed on the plants. This tank, which can be of any desired configuration and capacity, has a funnel-like extension 3 on the top thereof leading to a filling opening 4 normally closed by a removable apertured plate 5 held in place by bolts and nuts shown generally at 6.

A pump cylinder 7 is fixedly mounted in the top of the tank and extended downwardly thereinto, the lower end of this cylinder preferably being provided with a tubular extension 8 of rubber or other suitable material terminating close to the bottom of the tank. This cylinder is provided at its upper end with the usual air chamber 9 and the pump rod, indicated at 10, is mounted for reciprocation within cylinder and extends upwardly therefrom.

The upper end of pump rod or plunger 10 has a head 11 pivotally connected at its sides, as shown at 12, to pitmans 13 which are connected at their upper ends, as shown at 14 while their lower ends are connected to longitudinally adjustable extensions 14 mounted on wrist pins 15 extending laterally from the adjacent supporting wheels W. As shown particularly in Figure 6 the extension 14 is slotted longitudinally as at 16 so as to receive bolts 17 carried by the adjacent lapping portion of the pitman 13. With this arrangement each pitman can be elongated or reduced in length so as to insure proper operation of plunger 10.

It will be noted that the pitmans are so shaped as to overlie tank 2, extend downwardly adjacent to the sides thereof, and to extend outwardly beyond the sides of the wheels W.

The pump is of any preferred type. It is preferred to use one having a valve piston so that during every upstroke of the pump a quantity of liquid will be forced outwardly therefrom, the air chamber, holding air under pressure, serving to maintain pressure during the reverse stroke of the piston. This type of pump is so common in practice that it is not deemed necessary to show or describe it in detail.

The pump is provided with an outlet nipple 18 and also with a return constituting a release device for the pump. This return includes a T-fitting or head 19 connected to nipple 18 preferably by a short length of flexible tubing 20 and is also connected by a return pipe 21 to a fitting 22 which opens downwardly into the top portion of tank 2. This fitting 22 is equipped with a release valve 23 so that should back pressure within nipple 18 and the parts extending therefrom become excessive, said valve will open to permit excess pressure to be relieved by the return flow of fluid through fitting 22 to the tank 2.

A supplemental frame is secured to the rear portion of frame 1 and includes parallel upwardly extending angle strips 24 projecting well above the level of the top of tank 2 where they are joined by a cross strip 25. At an intermediate point these angle strips are also joined by crossed connected braces 26 and by a cross strip 27 the ends of which are secured to the upwardly and rearwardly inclined handles 28 of the machine. The forward end of these handles are suitably joined, as by means of upstanding strips 29 to the forward portion of frame 1.

Cross strip 27 serves to support the head or T-fitting 19 and joined to this T-fitting is another fitting 30 having valve casings 31 extending in opposite directions therefrom and each carrying a valve 32. These casings are joined to flexible hose 33 which, in turn, are coupled, at 34, to headers 35 in the form of pipes. Each pipe has a spraying head 36 at its outer end while at an intermediate point there is a forwardly extending arm 37 formed of pipe and carrying a sprinkler head 38. The sprinkler heads are also joined as to be capable of being adjusted angularly relative to the pipes to which they are connected, due to the screw-threaded connections between the parts, it being obvious by referring to Figures 1 and 4 that these sprinkler heads can be swung toward or from each other so that the spray will be delivered at any predetermined angle relative to the plants under treatment.

The side strips 24 of the supplemental frame are adjustably engaged, at their upper ends, by extension angle strips 39, there being bolt holes 40 in these strips any of which can be employed to receive the fastening bolts 41 carried by the strips 24 of the supplemental frame.

The headers 35 are adapted to be placed with their inner end portions crossing the extension strips 39 and these headers are held adjustably to the extension strips by clamps 42 in the form of U-bolts proportioned to straddle the headers and strips. Obviously by providing an arrangement of this kind, the headers can be adjusted longitudinally and also can be adjusted upwardly and downwardly until the spraying heads are brought to desired positions relative to the main frame 1 and to the rows of plants to be sprayed.

Tank 2 can be securely fastened to the main frame 1 in any suitable manner. For example an upwardly extending strip 43 secured to frame 1 can be extended along the back portion of the tank and bolted or otherwise attached thereto while connecting plates 44 can join other parts of the tank to the frame as shown.

Secured to the head 11 so as to move therewith, is a rearwardly extending tongue 45 formed at the upper end of an agitating strip 46 which is slidably mounted in a slot 47 in the top of tank 2. This strip is guided within the tank by a bracket 48 joined to the pump cylinder 7 and the lower end of the strip carries an agitating blade 49 in the form of a plate provided with apertures 50, as shown by dotted lines in Figure 2.

In practice the tank 2 is provided with a supply of liquid to be used for spraying purposes. The machine is then moved along a field between rows of plants to be sprayed and during this movement the rotating wheels W will transmit motion through the pitmans 13 to the pump plunger and agitator. This will result in the lifting of fluid from tank 2 while it is being agitated by the blades 49. The lifted fluid will be expelled through the connections 18, 20, 19 and 30 to the valve casings 31 and if the valves 32 are open, this liquid will further be directed under pressure through the hose or flexible tubes 33 to the headers 35 and thence to the spraying heads. Should either or both of the valves be closed, and the machine operated without delivering any spray, the excess pressure set up within the apparatus will result in return of the fluid to the tank by way of pipe 21, it being understood of course that the release valve 23 will open under this pressure. Consequently no injury to the apparatus will result.

As before stated the headers can be adjusted upwardly and downwardly or inwardly and outwarly and the spraying heads can also be adjusted angularly. Thus the apparatus can be adapted readily to the conditions under which it is to be used.

Importance is attached to the fact that the headers are carried by the adjustable supplemental frame which, in turn, is supported on the main frame. This provides a very compact but simple form of support and by disconnecting the supplemental frame from main frame 1 and handles 28, the machine obviously can be rendered very compact for storage or shipment, the parts subsequently being assembled without requiring the services of a skilled mechanic.

What is claimed is:

1. The combination with a wheel-supported main frame, a tank supported thereby, and handles fixedly connected to the main frame, of headers, a pipe connection between the headers and the tank, and detachable and adjustable means for supporting the headers, said means comprising upwardly extended angle strips secured to the main frame, a cross-member fastened thereto and between and to the handles, a three-way fitting fixedly secured to the cross-member, outflow and return pipe connections between said fitting and the tank, headers supported by and adjustably connected to the angle strips, and valved flexible tube connections between the header and said fitting.

2. The combination with a wheel-supported main frame, handles extending therefrom and a tank on the main frame, of a supplemental frame including upturning angle strips detachably secured to the main frame, a cross-strip connecting the main strips and interposed between and attached to the handles, extension angle strips adjustably connected to and projecting upwardly from the first named angle strips, laterally extending headers secured to the respective extension strips and adjustable upwardly and downwardly and laterally relative thereto, sprinkling heads carried by the headers, a pipe fitting carried by the cross-strip, flexible tubular connections between said fitting and the respective headers, and detachable pipe connections between the fitting and the tank.

GROVER S. SIMMONS.